US011392690B2

(12) United States Patent
Hung et al.

(10) Patent No.: US 11,392,690 B2
(45) Date of Patent: Jul. 19, 2022

(54) SECURITY MONITORING APPARATUS AND METHOD FOR VEHICLE NETWORK

(71) Applicant: Institute For Information Industry, Taipei (TW)

(72) Inventors: I-Chou Hung, Taipei (TW); Chih-Min Shih, Taipei (TW); Hsing-Yu Chen, Taipei (TW); Wen-Kai Liu, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 191 days.

(21) Appl. No.: 16/693,835

(22) Filed: Nov. 25, 2019

(65) Prior Publication Data

US 2021/0103655 A1 Apr. 8, 2021

(30) Foreign Application Priority Data

Oct. 4, 2019 (TW) .................................. 108136062

(51) Int. Cl.
*G06F 21/55* (2013.01)
*G06F 21/73* (2013.01)
*H04L 9/08* (2006.01)

(52) U.S. Cl.
CPC ............ *G06F 21/554* (2013.01); *G06F 21/73* (2013.01); *H04L 9/0891* (2013.01); *G06F 2221/034* (2013.01)

(58) Field of Classification Search
CPC .. G06F 21/554; G06F 21/73; G06F 2221/034; H04L 9/0891

(Continued)

(56) References Cited

U.S. PATENT DOCUMENTS 10,530,793 B2 * 1/2020 Galula .................... H04L 67/12
10,911,182 B2 * 2/2021 Kishikawa ........... G06K 9/6269
(Continued)

FOREIGN PATENT DOCUMENTS

CN       106027260 B      4/2019
EP         2646994 B1      5/2015
WO   WO 2018/198297 A1   11/2018

OTHER PUBLICATIONS

Office Action to the corresponding Taiwan Patent Application No. 108136062 rendered by the Taiwan Intellectual Property Office (TIPO) dated May 29, 2020, 9 pages (including English translation).

(Continued)

*Primary Examiner* — Dereena T Cattungal
(74) *Attorney, Agent, or Firm* — Birch, Stewart, Kolasch & Birch, LLP

(57) ABSTRACT

A security monitoring apparatus and method for a vehicle network are provided. The apparatus transmits an indicator and an encryption key to a plurality of electronic control units via the controller area network interface. The apparatus receives a response code from each electronic control unit via the controller area network interface, wherein each of the response codes is generated by a serial number of each electronic control unit and the encryption key via a hash algorithm. The apparatus compares the response code returned by each electronic control unit according to a list, the encryption key and the hash algorithm to determine whether each electronic control unit correctly returns the response code. The apparatus determines to generate an alert signal when one of the electronic control units does not correctly return the response code.

12 Claims, 5 Drawing Sheets

(58) Field of Classification Search
    USPC .......................................................... 726/23
    See application file for complete search history.

(56) References Cited

U.S. PATENT DOCUMENTS

| | | | |
|---|---|---|---|
| 2017/0060559 A1* | 3/2017 | Ye | H04L 63/061 |
| 2017/0093866 A1* | 3/2017 | Ben-Noon | H04L 63/10 |
| 2019/0281052 A1* | 9/2019 | Lekkas | H04L 9/14 |
| 2020/0211301 A1* | 7/2020 | Zhang | H04L 63/126 |
| 2020/0220716 A1* | 7/2020 | Haga | G06F 21/6218 |
| 2021/0078512 A1* | 3/2021 | Ghannam | H04L 63/12 |
| 2021/0203682 A1* | 7/2021 | Bajpai | H04L 67/12 |

OTHER PUBLICATIONS

CNOA_2019110754027—dated—Dec. 3, 2021; pp. 1-14.

* cited by examiner

| Name | Unit code | Serial number |
|---|---|---|
| Engine control electronic control unit | EID1 | SN1 |
| Power control electronic control unit | EID2 | SN2 |
| Anti-lock braking system (ABS) electronic control unit | EID3 | SN3 |
| Fault diagnosis electronic control unit | EID4 | SN4 |

FIG. 2

SECURITY MONITORING APPARATUS AND METHOD FOR VEHICLE NETWORK

PRIORITY

This application claims priority to Taiwan Patent Application No. 108136062 filed on Oct. 4, 2019, which is hereby incorporated by reference in its entirety.

FIELD

The present invention relates to a security monitoring apparatus and method for a vehicle network. In particular, the present invention relates to a security monitoring apparatus and method for a controller area network installed on a vehicle.

BACKGROUND

With the rapid development of the science and technology, all kinds of vehicles are loaded with various electronic control units (ECUs) to control and detect various electronic apparatuses installed on the vehicles and associated components. Generally speaking, a vehicle network is also called a controller area network (CAN), and the controller area network is a vehicle bus standard currently widely used for vehicles and allows the electronic control units on the vehicles to communicate with each other through a controller area network bus.

However, since the internal communication of the controller area network is based on the broadcasting mechanism of an information-oriented transmission protocol, no information security protection measure is provided for the transmission of internal messages. In addition, under the mechanism of the controller area network, there is no monitoring mechanism for the known nodes or newly added nodes, and because there is no host computer to monitor the node composition (e.g., various electronic control units) and messages under the controller area network, it gives intentional persons an opportunity to take advantage. When a certain node under the controller area network is invaded (e.g. replaced or counterfeited), the intruder can send illegal messages through the invaded node to affect the operation of the vehicle, which may endanger the driving safety of the vehicle.

In addition, under the mechanism of the controller area network, an external apparatus can receive and transmit messages over the controller area network as long as the external apparatus is connected to the controller area network of the vehicle through the controller area network bus. However, because the operation mechanism of the controller area network does not control the nodes in the controller area network and does not provide any information security protection measure for the transmission of internal messages, illegal messages that may exist in the controller area network cannot be detected.

Accordingly, an urgent need exists in the art to provide a security protection mechanism for the controller area network under the existing controller area network architecture, monitor the nodes under the controller area network, and prevent intentional persons from invading the vehicle network and thus affecting the operation of the vehicle.

SUMMARY

Provided is a security monitoring apparatus for a vehicle network, and the security monitoring apparatus is installed on a vehicle. The security monitoring apparatus may comprise a controller area network interface, a storage and a processor, wherein the processor is electrically connected to the controller area network interface and the storage. The controller area network interface is connected to a controller area network of the vehicle through a controller area network bus. The storage stores a list and an encryption key, wherein the list stores a unit code and a serial number of each of a plurality of electronic control units connected to the controller area network. The processor performs the following operations: (a) transmitting an indicator and the encryption key to the electronic control units through the controller area network interface, wherein the indicator is related to a first controller area network identification code and the unit code, and the encryption key is encrypted by an encryption algorithm; (b) receiving a response code of each of the electronic control units from the electronic control units through the controller area network interface, wherein each of the response codes is generated by the serial number of each of the electronic control units and the encryption key through a hash algorithm; (c) comparing the response code returned by each of the electronic control units based on the list, the encryption key and the hash algorithm to determine whether each of the electronic control units correctly returns the response code; and (d) generating an alert signal when one of the electronic control units does not correctly return the response code.

Also provided is a security monitoring method for a vehicle network, and the security monitoring method is adapted for use in an electronic apparatus. The electronic apparatus is installed on a vehicle, and the electronic apparatus comprises a controller area network interface, a storage and a processor. The controller area network interface is connected to a controller area network of the vehicle through a controller area network bus. The storage stores a list and an encryption key, wherein the list stores a unit code and a serial number of each of a plurality of electronic control units connected to the controller area network. The security monitoring method for a vehicle network is executed by the processor and comprises the following steps: (a) transmitting an indicator and the encryption key to the electronic control units through the controller area network interface, wherein the indicator is related to a first controller area network identification code and the unit code, and the encryption key is encrypted by an encryption algorithm; (b) receiving a response code of each of the electronic control units from the electronic control units through the controller area network interface, wherein each of the response codes is generated by the serial number of each of the electronic control units and the encryption key through a hash algorithm; (c) comparing the response code returned by each of the electronic control units based on the list, the encryption key and the hash algorithm to determine whether each of the electronic control units correctly returns the response code; and (d) generating an alert signal when one of the electronic control units does not correctly return the response code.

In the security monitoring technology (at least including the apparatus and the method) provided herein, an authentication mechanism is performed on known nodes in a controller area network, the security monitoring apparatus transmits an encryption key, the node generates a response code according to its own serial number and the encryption key through a hash algorithm, and the security monitoring apparatus verifies whether the response code of each of the nodes is correct. When one of the nodes does not correctly return the response code, the security monitoring apparatus generates an alert signal. In addition, the security monitoring apparatus may further receive from each node a controller area network identification code that may be used by the node and the corresponding transmission frequency, so abnormal transmission data can be found in advance and a warning message can be issued when abnormal controller area network identification code and transmission frequency occur in the controller area network. In addition, since the authentication mechanism is built on the application level, the architectures of the traditional controller area network and the packet transmission do not need to be changed, and thus the disclosed technology herein is more applicable to the existing controller area network architecture products. Therefore, the disclosed technology herein can effectively monitor the safety of the vehicle network to prevent intentional persons from invading the vehicle network and thus affecting the operation of the vehicle, thereby ensuring the driving safety of the vehicle.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

FIG. 2 depicts a specific exemplary example of a list;

DETAILED DESCRIPTION

In the following description, a security monitoring apparatus and method for a vehicle network will be explained with reference to certain example embodiments thereof. However, these example embodiments are not intended to limit the present invention to any specific examples, embodiments, environment, applications or particular implementations described in these example embodiments. Therefore, description of these example embodiments is only for purpose of illustration rather than to limit the scope of the present invention.

It should be appreciated that, in the following embodiments and the attached drawings, elements unrelated to the present invention are omitted from depiction; and dimensions of and dimensional scales among individual elements in the attached drawings are provided only for illustration, but not to limit the scope of the present invention.

Figure 1A:
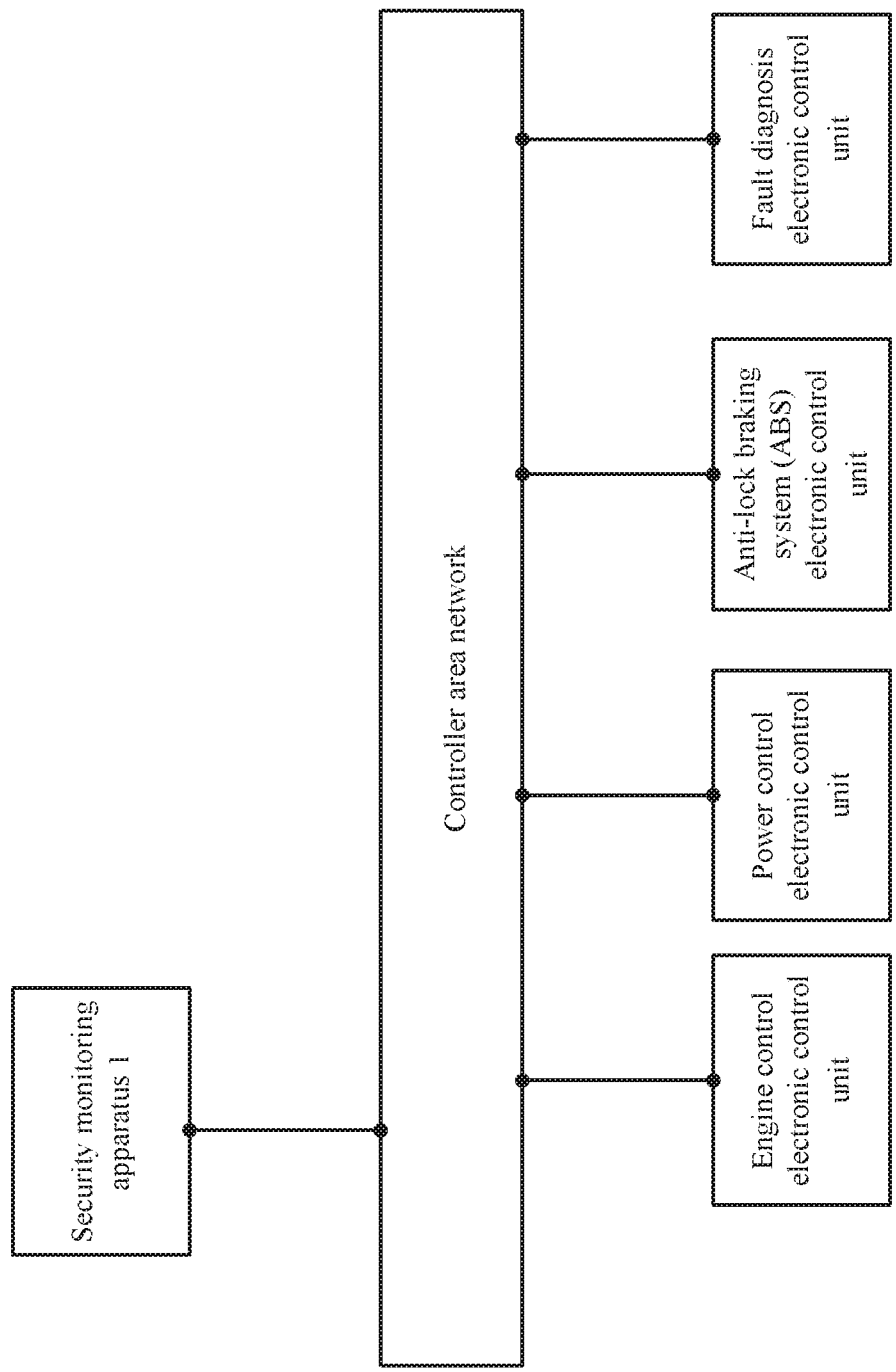
FIG. 1A is a schematic architectural view depicting a controller area network for a vehicle according to a first embodiment.

A first embodiment of the present invention is as shown in FIG. 1A to FIG. 2. FIG. 1A illustrates a schematic architectural view of a controller area network (which is called a CAN hereinafter) for a vehicle. In FIG. 1A, there are five nodes connected to the CAN, the five nodes are an engine control electronic control unit, a power control electronic control unit, an anti-lock braking system (ABS) electronic control unit, a fault diagnosis electronic control unit and the security monitoring apparatus 1 of the present invention respectively. The security monitoring apparatus 1 of the present invention is connected to the CAN of the vehicle through a controller area network bus (which is called a CAN bus hereinafter). It shall be noted that, the number of electronic control units connected to the CAN is not limited by the present invention. In other words, in other embodiments of the present invention, the security monitoring apparatus 1 is excluded from the electronic control units and communicates with the electronic control units via the controller area network, and the security monitoring apparatus 1 may be connected with more electronic control units via the CAN depending on the scale and actual demand of the CAN. In addition, the schematic diagram only depicts a part of the structure of the CAN and omits some elements, e.g., the electronic control unit is further connected to other elements (e.g., a door, a wiper, an engine or other components).

Figure 1B:
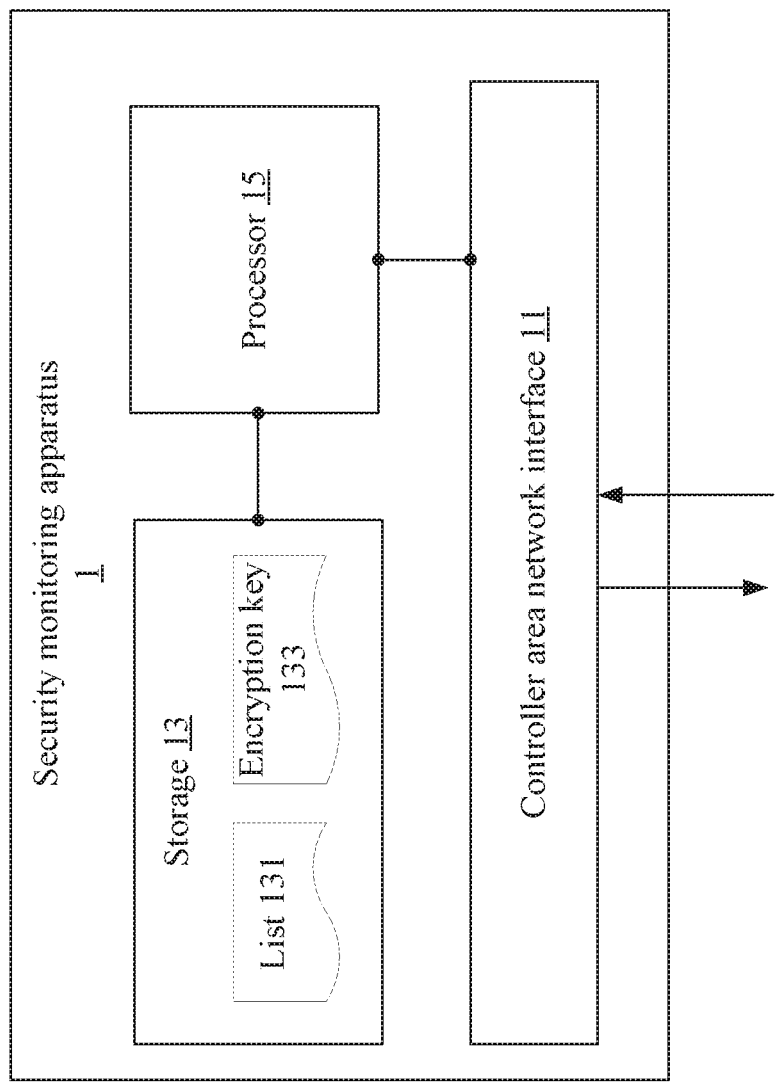
FIG. 1B is a schematic architectural view depicting a security monitoring apparatus according to the first embodiment.

The first embodiment of the present invention is a security monitoring apparatus 1, and a schematic architectural view of the apparatus is depicted in FIG. 1B. The security monitoring apparatus 1 comprises a controller area network interface 11 (which is called a CAN interface 11 hereinafter), a storage 13 and a processor 15, and the processor 15 is electrically connected to the CAN interface 11 and the storage 13. The CAN interface 11 is an interface capable of receiving and transmitting data or other interfaces capable of receiving and transmitting data known to those of ordinary skill in the art.

The storage 13 may be a memory, a Universal Serial Bus (USB) disk, a hard disk, an optical disk, a portable disk or any other storage media or circuits with the same function and well known to those of ordinary skill in the art. The processor 15 may be one of various processors, central processing units, microprocessors, digital signal processors or other computing apparatuses known to those of ordinary skill in the art.

In this embodiment, the CAN interface 11 of the security monitoring apparatus 1 is connected to the CAN of the vehicle (e.g., the controller area network illustrated in FIG. 1A) through the CAN bus. The storage 13 stores a list 131 and an encryption key 133, wherein the list 131 stores a unit code (which is also called an electronic identity (EID)) and a serial number (SN) of each of a plurality of electronic control units connected to the CAN. It shall be noted that, the list 131 is pre-established and maintained by the security monitoring apparatus 1, and may also be directly received by an external apparatus in some embodiments.

It shall be noted that, not only the security monitoring apparatus 1 stores the unit code and the serial number of each of the electronic control units, but each of the electronic control units also stores its own unit code and serial number. Specifically, the unit code is a fixed name assigned by the security monitoring apparatus 1 to each of the electronic control units, and the serial number is a number used for the subsequent verification by the security monitoring apparatus 1 for each of the electronic control units, and the value thereof may vary due to different encryption/hashing mechanisms. The verification method adopted by the security monitoring apparatus 1 for each of the electronic control units will be described in detail in the following paragraphs.

For ease of understanding, please refer to FIG. 2 for a specific exemplary example of the list. Taking the CAN architecture of FIG. 1 as an example, the list shown in FIG. 2 stores four known nodes, which are respectively the engine control electronic control unit, the power control electronic control unit, the anti-lock braking system (ABS) electronic control unit and the fault diagnosis electronic control unit and respectively correspond to unit codes "EID1", "EID2", "EID3", "EID4" and serial numbers "SN1", "SN2", "SN3" and "SN4".

For ease of understanding, first the operation flow of this embodiment will be briefly described. The security monitoring apparatus 1 performs the subsequent verification by sending a preset message (including a preset identification code and an encryption key) to each of the nodes in the CAN (i.e., each of the electronic control units) and commanding each of the nodes to return its own return value. Then, each of the nodes generates a return value after performing the hash algorithm operation according to the received encryption key and its own serial number, and transmits the return value back to the security monitoring apparatus 1. Finally, the security monitoring apparatus 1 verifies whether the return value received from each of the nodes is correct according to the serial number recorded in the list 131 and the encryption key, thereby determining whether each of the known nodes (i.e., the nodes recorded in the list 131) is abnormal/invaded. Details of each operation will be described in detail in the following paragraphs.

First, the security monitoring apparatus 1 initiates the verification operation, and the processor 15 transmits an indicator (not shown) and the encryption key 133 to the electronic control units through the CAN interface 11, wherein the indicator is related to a first controller area network identification code and the unit code, and the encryption key 133 is encrypted by an encryption algorithm. Specifically, the indicator is a return instruction agreed in advance between the security monitoring apparatus 1 and each of the electronic control units, and each of the electronic control units needs to return a corresponding response value when the electronic control unit heard the preset identification code.

It shall be noted that under the mechanism of CAN, any transmission data transmitted in the CAN must carry a controller area network identification code (which is called a CAN ID hereinafter) and a data content, the CAN ID is used to identify the purpose, type, receiving object or the like of the transmission data, and usually, the same type of transmission data is transmitted by the same CAN ID. More specifically, under the mechanism of CAN, the transmission data in the CAN is open to all nodes for listening, and the CAN ID enables each of the nodes to know whether the transmission data is to be received by itself. That is, a certain node (i.e., electronic control unit) will only act on the transmission data of a certain type of CAN ID. For example, the anti-lock braking system (ABS) electronic control unit may only perform a corresponding operation on the transmission data of which the CAN ID is of a brake type.

For example, the security monitoring apparatus 1 may agree with each of the electronic control units to use the idle CAN ID of 999 and the unit code of the security monitoring apparatus 1 as indicators (i.e., the security monitoring apparatus 1 transmits the transmission data of which the CAN ID is 999 and the data content is the unit code of the security monitoring apparatus 1 to the CAN). Then, when each of the electronic control units receives the transmission data of which the CAN ID is 999 and the data content is the unit code of the security monitoring apparatus 1, it means that the electronic control unit needs to return data for verification. Then, the security monitoring apparatus 1 transmits the transmission data of which the CAN ID is 998 and the data content is the encryption key 133 to each of the electronic control units.

Generally speaking, the fixed format of the transmission data in the CAN is 8 bytes, and since this length is too short to be safe for general encryption keys, different parts of the encryption key can be transmitted in multiple times through a CAN ID of 998 (e.g., the encryption key is divided into 4 parts and transmitted in multiple times). In addition, in the mechanism of CAN, the transmission data of a lower CAN ID has a higher priority. Therefore, using the CAN ID of 998 for transmission can ensure the priority to transmit the transmission data of the encryption key. It shall be noted that, the use of the CAN ID of 999 and the CAN ID of 998 herein by the security monitoring apparatus 1 to transmit data is only one example and is not intended to limit the scope of the present invention, and those of ordinary skill in the art shall understand the operation method of this embodiment according to the content thereof, and thus this will not be further described herein.

In addition, since the CAN is for the transmission of open data and any node can listen to the transmission data over the CAN, the security monitoring apparatus 1 encrypts the encryption key 133 during the data transmission in order to prevent intentional persons from knowing the encryption key 133 through CAN monitoring, and the encrypted encryption key 133 is first decrypted and then used by each of the electronic control units receiving the encryption key 133. For example, the encryption key 133 may be encrypted through symmetric encryption or asymmetric encryption, but it is not limited thereto. Various embodiments of the encryption of the present invention shall be appreciated by those of ordinary skill in the art based on the foregoing description, and thus will not be further described herein.

Next, in this embodiment, each of the electronic control units receives and then decrypts the encryption key 133, and then generates a response code of the electronic control unit and returns the response code to the security monitoring apparatus 1. For example, each of the electronic control units adds its own serial number and the encryption key 133, and generates the response code (i.e., an encrypted string) through a hash algorithm (e.g., an SHA 256 hash algorithm, without being limited thereto) and transmits the response code to the security monitoring apparatus 1. Since the security monitoring apparatus 1 also stores the serial number of each of the electronic control units and encryption key 133, the response code returned by each of the electronic control units can be checked through the same hash algorithm.

Regarding the return mode of each of the electronic control units, the engine control electronic control unit in FIG. 2 is taken as an example for illustration. The engine control electronic control unit first through transmit the transmission data of which the CAN ID is 999 and the data content is EID1 to enables the security monitoring apparatus 1 to know which electronic control unit is currently reporting information. Then, the transmission data of which the CAN ID is 998 and the data content is the response code (i.e., a hash value obtained after adding the serial number of the electronic control unit and the encryption key 133) is returned to the security monitoring apparatus 1. In some embodiments, each of the electronic control units also encrypts the response code (e.g., through symmetric encryption or asymmetric encryption) before returning the response code to prevent intentional persons from counterfeiting the response code. Various embodiments of the encryption of the present invention shall be appreciated by those of ordinary skill in the art based on the foregoing description, and thus will not be further described herein.

Subsequently, the processor 15 receives the response code of each of the electronic control units from the electronic control units through the CAN interface 11, wherein each response code is generated by the serial number of each electronic control unit and the encryption key through a hash algorithm. Next, the processor 15 compares the response code returned by each of the electronic control units based on the list, the encryption key and the hash algorithm to determine whether each of the electronic control units correctly returns the response code. Specifically, since the list 131 of the security monitoring apparatus 1 has already stored the serial number of each of the electronic control units and the encryption key 133, the processor 15 generates a verification code corresponding to each of the electronic control units through the hash algorithm by using the encryption key 133 and the serial numbers in the list 131, and then compares whether the response code returned by each of the electronic control units and the verification code of the electronic control unit are equal, thereby determining whether each of the electronic control units correctly returns the response code.

Finally, the processor 15 generates an alert signal when one of the electronic control units does not correctly return the response code. It shall be noted that, the security monitoring apparatus 1 performs verification according to the known nodes (i.e., each of the electronic control units) stored in the list 131, and for each of the electronic control units that cannot send the correct response code or does not send the response code, the security monitoring apparatus 1 can determine that it may have been invaded (e.g., replaced or counterfeited) to become an illegal node, and the processor 15 generates an alert signal for warning of possible illegal behaviors.

In some embodiments, the processor 15 further regularly updates the encryption key 133 to prevent intentional persons from recording relevant information. For example, the processor 15 may update the encryption key 133 according to a preset interval (e.g., every 24 hours). As another example, the processor 15 may update the encryption key 133 each time the vehicle starts.

In some embodiments, in order to prevent intentional persons from recording relevant information of the nodes, the security monitoring apparatus 1 and each of the electronic control units may agree on a mechanism to update the serial number thereof. Specifically, the processor 15 may regularly change the serial number of each of the electronic control units in the list according to a predetermined rule, and the predetermined rule may be a set of a plurality of hash algorithms. Each time after the verification operation is performed, the processor 15 and each of the electronic control units update the old serial numbers into new serial numbers using another hash algorithm (e.g., hash algorithms such as SHA-1, SHA-224, SHA-256, SHA-384 and SHA-512, without being limited thereto) agreed in the predetermined rule, thereby iteratively updating the serial numbers to prevent the counterfeited node from recording node-related information.

In some embodiments, the processor further periodically performs the aforementioned verification operation initiated by the security monitoring apparatus 1 based on a verification cycle (e.g., every 10 minutes) to regularly verify the safety of the known nodes of the CAN (i.e., each of the electronic control units in the list 131), thereby reducing possible risks. In addition, the mechanism of CAN lacks a monitoring mechanism for nodes that join in the CAN maliciously (i.e., nodes not in the list 131), and the malicious nodes may send illegal messages to affect the operation of the vehicle, which will endanger the driving safety of the vehicle and cause possible safety hazards. Therefore, in some embodiments, the security monitoring apparatus 1 further receives the CAN ID that may be used by each of the electronic control units and the corresponding transmission frequency from each of the electronic control units so that abnormal transmission data can be found in advance and a warning message can be issued when abnormal CAN ID and transmission frequency are monitored in the CAN. Specifically, the processor 15 receives a frequency list of each of the electronic control units from the electronic control unit through the controller area network interface (the CAN interface), wherein each of the frequency lists stores a plurality of controller area network identification codes used by each of the electronic control units and a transmission frequency corresponding to each of the controller area network identification codes; and the processor 15 determines whether there is an illegal message in the CAN based on the frequency lists.

In some embodiments, each of the electronic control units also first encrypts the frequency list (e.g., through symmetric encryption or asymmetric encryption) before returning the frequency list to prevent intentional persons from stealing the frequency list. Various embodiments of the encryption of the present invention shall be appreciated by those of ordinary skill in the art based on the foregoing description, and thus will not be further described herein.

According to the above descriptions, the security monitoring apparatus 1 of the present invention may perform an authentication mechanism on known nodes in the CAN network, the security monitoring apparatus 1 transmits an encryption key, the node generates a response code according to its own serial number and the encryption key through a hash algorithm, and the security monitoring apparatus 1 verifies whether the response code of each of the nodes is correct. When one of the nodes does not correctly return the response code, the security monitoring apparatus 1 generates an alert signal. In addition, the security monitoring apparatus 1 may further receive from each node a CAN ID that may be used by the node and the corresponding transmission frequency, so abnormal transmission data can be found in advance and a warning message can be issued when abnormal CAN ID and transmission frequency occur in the CAN. In addition, since the authentication mechanism of the present invention is built on the application level, the architecture of the traditional CAN and the packet transmission does not need to be changed, and the present invention is more applicable to the existing CAN architecture products. Therefore, the present invention can effectively monitor the safety of the vehicle network to prevent intentional persons from invading the vehicle network and thus affecting the operation of the vehicle, thereby ensuring the driving safety of the vehicle.

Figure 3:
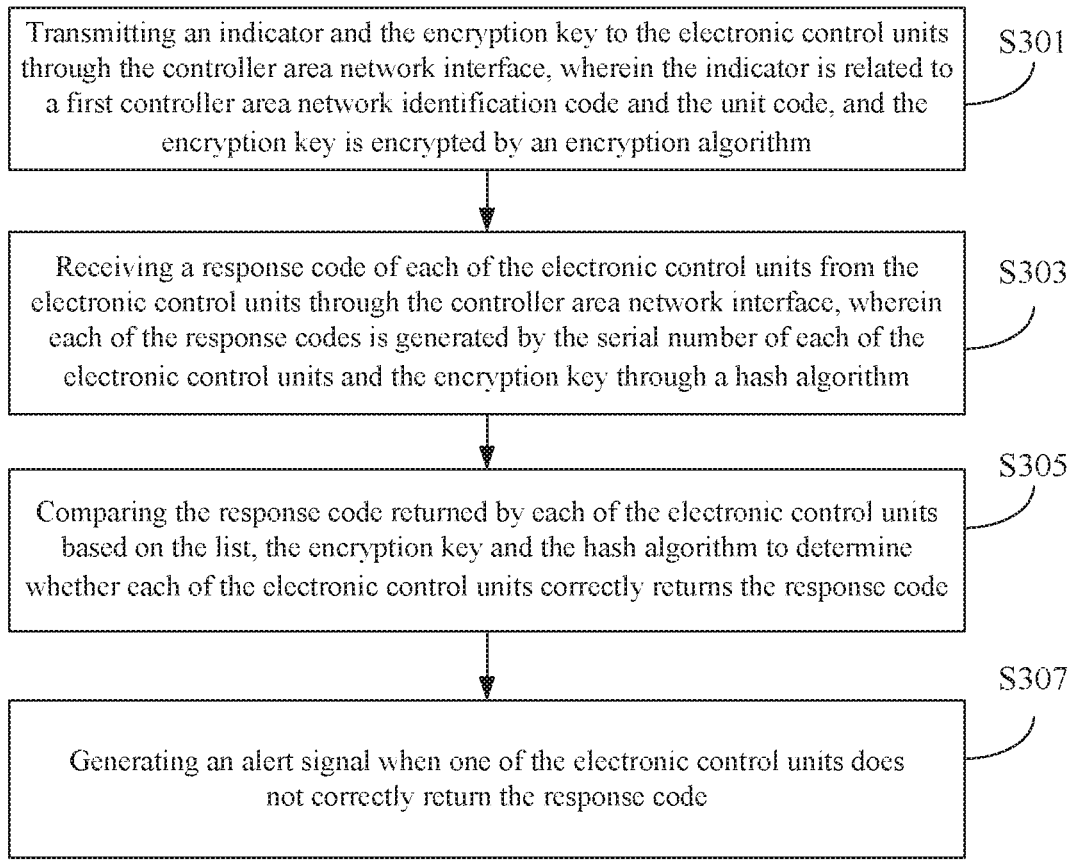
FIG. 3 is a flowchart diagram depicting a part of a security monitoring method according to a second embodiment.

A second embodiment of the present invention is a security monitoring method for a vehicle network, and a flowchart diagram thereof is depicted in FIG. 3. The security monitoring method is adapted for use in an electronic apparatus installed on a vehicle, e.g., the security monitoring apparatus 1 of the first embodiment. The electronic apparatus comprises a controller area network interface, a storage and a processor. The controller area network interface is connected to a controller area network of the vehicle through a controller area network bus. The storage stores a list and an encryption key, wherein the list stores a unit code and a serial number of each of a plurality of electronic control units connected to the controller area network. The security monitoring method is executed by the processor, and the security monitoring method generates the control area network for monitoring the vehicle by steps S301 to S307.

In the step S301, the electronic apparatus transmits an indicator and the encryption key to the electronic control units through the controller area network interface, wherein the indicator is related to a first controller area network identification code and the unit code, and the encryption key is encrypted by an encryption algorithm. In step S303, the electronic apparatus receives a response code of each of the electronic control units from the electronic control units through the controller area network interface, wherein each of the response codes is generated by the serial number of each of the electronic control units and the encryption key through a hash algorithm.

Next, in step S305, the electronic apparatus compares the response code returned by each of the electronic control units based on the list, the encryption key and the hash algorithm to determine whether each of the electronic control units correctly returns the response code. Finally, in the step S307, the electronic apparatus generates an alert signal when one of the electronic control units does not correctly return the response code.

In some embodiments, the step S305 further comprises the following steps: generating a verification code corresponding to each of the electronic control units by performing the hash algorithm on the encryption key and the serial numbers in the list; and comparing whether the response code returned by each of the electronic control units and the verification code of the electronic control unit are equal to determine whether each of the electronic control units correctly returns the response code.

In some embodiments, the security monitoring method further comprises updating the encryption key regularly. In some embodiments, the security monitoring method further comprises regularly changing the serial number of each of the electronic control units in the list according to a predetermined rule, wherein the predetermined rule is related to another hash algorithm.

In some embodiments, the security monitoring method further comprises periodically executing the steps S301 to S307 based on a verification cycle.

Figure 4:
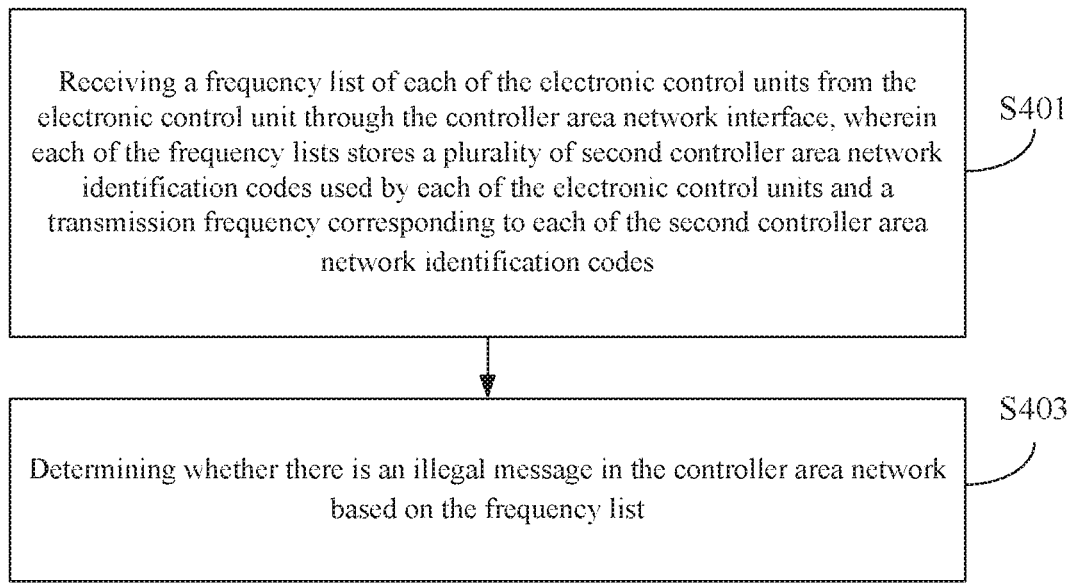
FIG. 4 is a flowchart diagram depicting a part of a method that is executed by some embodiments.

In some embodiments, the security monitoring method further comprises steps S401 to S403. Referring to FIG. 4, in the step S401, the electronic apparatus receives a frequency list of each of the electronic control units from the electronic control unit through the controller area network interface, wherein each of the frequency lists stores a plurality of second controller area network identification codes used by each of the electronic control units and a transmission frequency corresponding to each of the second controller area network identification codes. Next, in the step S403, the electronic apparatus determines whether there is an illegal message in the controller area network based on the frequency lists.

In addition to the aforesaid steps, the second embodiment can also execute all the operations and steps of the security monitoring apparatus 1 set forth in the first embodiment, have the same functions and deliver the same technical effects as the first embodiment. How the second embodiment executes these operations and steps, have the same functions and deliver the same technical effects as the first embodiment will be readily appreciated by those of ordinary skill in the art based on the explanation of the first embodiment, and thus will not be further described herein.

It shall be appreciated that, in the specification and the claims of the present invention, some words (including the controller area network identification code) are preceded by terms "first" or "second", and the terms "first" or "second" are only used to distinguish different words. For example, the terms "first" and "second" used in the first controller area network identification code and the second controller area network identification code are only used to represent different controller area network identification codes.

According to the above descriptions, in the security monitoring technology (at least including the apparatus and the method) provided by the present invention, an authentication mechanism is performed on known nodes in the controller area network, the security monitoring apparatus 1 transmits an encryption key, the node generates a response code according to its own serial number and the encryption key through a hash algorithm, and the security monitoring apparatus 1 verifies whether the response code of each of the nodes is correct. When one of the nodes does not correctly return the response code, the security monitoring apparatus 1 generates an alert signal. In addition, the security monitoring apparatus 1 may further receive from each node a CAN ID that may be used by the node and the corresponding transmission frequency, so abnormal transmission data can be found in advance and a warning message can be issued when abnormal CAN ID and transmission frequency occur in the CAN. In addition, since the authentication mechanism of the present invention is built on the application level, the architecture of the traditional CAN and the packet transmission does not need to be changed, and the present invention is more applicable to the existing CAN architecture products. Therefore, the present invention can effectively monitor the safety of the vehicle network to prevent intentional persons from invading the vehicle network and thus affecting the operation of the vehicle, thereby ensuring the driving safety of the vehicle.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A security monitoring apparatus for a vehicle network, the security monitoring apparatus being installed on a vehicle and comprising:
  a controller area network interface, being connected to a controller area network of the vehicle through a controller area network bus;
  a storage, being configured to store a list and an encryption key, wherein the list stores a unit code and a serial number of each of a plurality of electronic control units connected to the controller area network, wherein the security monitoring apparatus is excluded from the electronic control units and communicates with the electronic control units via the controller area network;
  a processor, being electrically connected to the controller area network interface and the storage, and being configured to execute the following operations:
    (a) transmitting an indicator and the encryption key that is encrypted by an encryption algorithm to the electronic control units through the controller area network interface, wherein the indicator is related to a first controller area network identification code and the unit code;
    (b) receiving a response code of each of the electronic control units from the electronic control units through the controller area network interface, wherein each of the response codes is generated by the serial number of each of the electronic control units and the encryption key through a hash algorithm;

(c) comparing the response code returned by each of the electronic control units based on the list, the encryption key and the hash algorithm to determine whether each of the electronic control units correctly returns the response code; and (d) generating an alert signal when one of the electronic control units does not correctly return the response code.

2. The security monitoring apparatus of claim 1, wherein the operation (c) comprises the following operations:

generating a verification code corresponding to each of the electronic control units by performing the hash algorithm on the encryption key and the serial numbers in the list; and comparing whether the response code returned by each of the electronic control units and the verification code corresponding to the electronic control unit are equal to determine whether each of the electronic control units correctly returns the response code.

3. The security monitoring apparatus of claim 1, wherein the processor further updates the encryption key regularly.

4. The security monitoring apparatus of claim 1, wherein the processor further regularly changes the serial number of each of the electronic control units in the list according to a predetermined rule, wherein the predetermined rule is related to another hash algorithm.

5. The security monitoring apparatus of claim 1, wherein the processor further periodically performs the operations (a), (b), (c) and (d) based on a verification cycle.

6. The security monitoring apparatus of claim 1, wherein the processor further performs the following operations:

receiving a frequency list of each of the electronic control units from the electronic control unit through the controller area network interface, wherein each of the frequency lists stores a plurality of second controller area network identification codes used by each of the electronic control units and a transmission frequency corresponding to each of the second controller area network identification codes; and determining whether there is an illegal message in the controller area network based on the frequency lists.

7. A security monitoring method for a vehicle network, being adapted for use in a security monitoring apparatus installed on a vehicle, the security monitoring apparatus comprising a controller area network interface, a storage and a processor, the controller area network interface being connected to a controller area network of the vehicle through a controller area network bus, the storage storing a list and an encryption key, wherein the list stores a unit code and a serial number of each of a plurality of electronic control units connected to the controller area network, the security monitoring apparatus is excluded from the electronic control units and communicates with the electronic control units via the controller area network, and the security monitoring method is executed by the processor and comprises:

(a) transmitting an indicator and the encryption key that is encrypted by an encryption algorithm to the electronic control units through the controller area network interface, wherein the indicator is related to a first controller area network identification code and the unit code;

(b) receiving a response code of each of the electronic control units from the electronic control units through the controller area network interface, wherein each of the response codes is generated by the serial number of each of the electronic control units and the encryption key through a hash algorithm;

(c) comparing the response code returned by each of the electronic control units based on the list, the encryption key and the hash algorithm to determine whether each of the electronic control units correctly returns the response code; and (d) generating an alert signal when one of the electronic control units does not correctly return the response code.

8. The security monitoring method of claim 7, wherein the step (c) comprises:

generating a verification code corresponding to each of the electronic control units by performing the hash algorithm on the encryption key and the serial numbers in the list; and comparing whether the response code returned by each of the electronic control units and the verification code corresponding to the electronic control unit are equal to determine whether each of the electronic control units correctly returns the response code.

9. The security monitoring method of claim 7, further comprising updating the encryption key regularly.

10. The security monitoring method of claim 7, further comprising regularly changing the serial number of each of the electronic control units in the list according to a predetermined rule, wherein the predetermined rule is related to another hash algorithm.

11. The security monitoring method of claim 7, further comprising periodically executing the steps (a), (b), (c) and (d) based on a verification cycle.

12. The security monitoring method of claim 7, further comprising:

receiving a frequency list of each of the electronic control units from the electronic control unit through the controller area network interface, wherein each of the frequency lists stores a plurality of second controller area network identification codes used by each of the electronic control units and a transmission frequency corresponding to each of the second controller area network identification codes; and determining whether there is an illegal message in the controller area network based on the frequency lists.

* * * * *